United States Patent [19]

Furukawa et al.

[11] Patent Number: 5,346,941
[45] Date of Patent: Sep. 13, 1994

[54] POWDER FOR THE MODIFICATION OF THERMOPLASTIC RESINS

[75] Inventors: Haruhiko Furukawa; Akihiko Shirahata, both of Chiba, Japan

[73] Assignee: Dow Corning Toray Silicone Co., Ltd., Tokyo, Japan

[21] Appl. No.: 62,674

[22] Filed: May 17, 1993

[30] Foreign Application Priority Data

May 22, 1992 [JP] Japan ............................ 4-156025

[51] Int. Cl.$^5$ ............................................. C08K 5/54
[52] U.S. Cl. .................................... 524/268; 524/492; 524/588
[58] Field of Search ................... 524/268, 492, 588

[56] References Cited

U.S. PATENT DOCUMENTS

| | | | |
|---|---|---|---|
| 3,455,839 | 7/1969 | Rauner | 252/321 |
| 3,457,214 | 7/1969 | Modic | 260/37 |
| 4,387,176 | 6/1983 | Frye | 524/268 |
| 4,742,101 | 5/1988 | Yoshida | 524/268 |
| 4,800,124 | 1/1989 | Davis et al. | 524/268 |

FOREIGN PATENT DOCUMENTS

| | | |
|---|---|---|
| 57-170950 | 10/1982 | Japan . |
| 59-215335 | 12/1984 | Japan . |
| 61-066713 | 4/1986 | Japan . |
| 2263866 | 10/1990 | Japan . |
| 972594 | 5/1963 | United Kingdom . |

Primary Examiner—Melvyn I. Marquis
Assistant Examiner—Mark D. Sweet
Attorney, Agent, or Firm—Alexander Weitz

[57] ABSTRACT

A siloxane powder composition which can impart improved lubricity character to a thermoplastic resin is disclosed, said composition being prepared by mixing (A) 100 parts by weight of a liquid polydiorganosiloxane and (B) 40 to 200 parts by weight of a silica powder that has a specific surface of at least 50 $m_2/g$ using sufficient shear to prepare a powder in which the surface of component (B) is coated with component (A), and then mixing this powder with (C) 10 to 50 parts by weight of a polyorganosiloxane resin which is a solid at room temperature, said resin consisting essentially of ($R_3SiO_{\frac{1}{2}}$) siloxane units and ($SiO_2$) siloxane units in the molar ratio of 1:4 to 1:1, where R is selected from the group consisting of alkyl radicals and phenyl radical.

12 Claims, No Drawings

POWDER FOR THE MODIFICATION OF THERMOPLASTIC RESINS

FIELD OF THE INVENTION

The present invention relates to a powder for the modification of thermoplastic resins which is useful as an additive for modifying the physical properties of thermoplastic resins.

BACKGROUND OF THE INVENTION silicones, particularly the liquid polydimethylsiloxanes generally known as silicone oils, are fluid over a wide range of degrees of polymerization and have excellent interfacial properties due to their different affinities for organic resins. As a result, they have become widely used as additives for improving the moldability, slip or lubricity, release properties, and mechanical properties of thermoplastic resins (refer to Japanese Patent Publication Number Sho 57-170950).

However, these liquid polydimethylsiloxanes are by nature fluid in addition on to being difficult to compatibilize with thermoplastic resins, and as s consequence have poor processing and handling properties and are difficult to mix to homogeneity into solid thermoplastic resins. Thus, as discussed below, a number of problems occur when liquid polydimethylsiloxanes are mixed into thermoplastic resins. The following procedure is typically used in order to blend liquid polydimethylsiloxane into thermoplastic resin: the polydimethylsiloxane is first mixed with a small portion of the thermoplastic resin chips, and the resulting mixture and the remaining major portion of the thermoplastic resin chips are then fed to an extruder mixer, where they are melt-mixed. However, the liquid polydimethylsiloxane sticks to the walls of the mixer during preparation of the preliminary mixture, and this prevents its quantitative addition.

Another procedure in use employs melt-mixing by directly introducing the liquid polydimethylsiloxane and unmodified thermoplastic resin chips into an extruder mixer. However, this procedure essentially cannot produce thermoplastic resin in which the liquid polydimethylsiloxane is homogeneously dispersed. Moreover, this procedure requires the use of a special mixer and novel feed devices, such as pumps.

In order to overcome these problems, Japanese Patent Application Laid Open Number Sho 59-215335 proposes a method in which, for example, silica powder and liquid polydimethylsiloxane are mixed to give a moist or wetted powder, and this wetted powder is then melt-mixed into the thermoplastic resin. However, in the case of the silica powder/liquid polydimethylsiloxane mixture prepared in accordance with this method, the liquid polydimethylsiloxane is held in the form of a thin coating layer on the silica powder, and aggregates of autonomous particles are not present. In other words, the structure in which the liquid polydimethylsiloxane is held in a metastable state in the spaces between primary particles in the silica powder, is an unstable structure when duplicated at higher orders. Due to this, the liquid polydimethylsiloxane readily separates from the silica powder during the course of storage for a number of hours. In particular, such a mixture evidences tack or stickiness due to the liquid polydimethylsiloxane present at its surface. As a consequence, this powder will stick to the walls of the machinery, either when initially mixed with thermoplastic resin chips or when introduced into a device such as a direct extruder mixer, and the like. This again causes the problem of a loss of quantitativeness, inter alia, and this method is thus not entirely satisfactory.

SUMMARY OF THE INVENTION

The present inventors have discovered that the above described problems do not occur in the case of a powder prepared by the high-shear mixing of a special polyorganosiloxane resin into a powder that has already been prepared by the high-shear mixing of liquid polydiorganosiloxane and silica powder.

The present invention takes as its object the introduction of a powder for the modification of thermoplastic resins, wherein said powder is free of surface tack, has excellent handling characteristics, and can be uniformly and quantitatively mixed into thermoplastic resins.

The present invention therefore relates to a powder for the modification of thermoplastic resins, wherein said powder comprises (A) 100 weight parts of a liquid polydiorganosiloxane,
(B) 40 to 200 weight parts of a silica powder that has a specific surface of at least 50 m²/g, and
(C) 10 to 50 weight parts of a polyorganosiloxane resin hat is solid at room temperature and that is represented by the formula $$(R_3 SiO_{\frac{1}{2}})_m (SiO_2)_n$$

where R is alkyl or phenyl, m and n are integers having values of at least 1, and the ratio m:n is 1:4 to 1:1.

The present invention also relates to a method for the preparation of the above powder as well as the use thereof to modify thermoplastic resins.

DETAILED DESCRIPTION OF THE INVENTION

To describe the invention in greater detail, the liquid polydiorganosiloxane constituting component (A) comprises those liquid polydiorganosiloxanes generally known as silicone oils. A typical example of such liquid polydiorganosiloxane is straight-chain liquid polydiorganosiloxane whose molecular chain terminals consist of the $R^1{}_3SiO_{\frac{1}{2}}$ unit where $R^1$ is hydroxyl, or substituted or unsubstituted monovalent hydrocarbon groups and whose other siloxane units consist of the $R^2{}_2SiO_{2/2}$ unit where $R^2$ is substituted or unsubstituted monovalent hydrocarbon groups.

Such liquid polydiorganosiloxane is in fact known and is exemplified by trimethylsiloxy-endblocked polydimethylsiloxanes,
trimethylsiloxy-endblocked dimethylsiloxane-methyloctylsiloxane copolymer,
dimethylhydroxysiloxy-endblocked polydimethylsiloxanes,
trimethylsiloxy-endblocked methylphenylsiloxane-dimethylsiloxane copolymers,
trimethylsiloxy-endblocked diphenylsiloxane-dimethylsiloxane copolymers,
trimethylsiloxy-endblocked dimethylsiloxane-methylvinylsiloxane copolymers,
dimethylvinylsiloxy-endblocked polydimethylsiloxanes, and
dimethylvinylsiloxy-endblocked dimethylsiloxane-methylvinylsiloxane copolymers, among others.

These liquid polydiorganosiloxanes can be synthesized by well known methods.

In addition, while the degree of polymerization of the liquid polydiorganosiloxane is not specifically restricted, liquid polydiorganosiloxane is preferably used that has a viscosity at 25° C. of 1 to 300,000 centistokes.

The silica powder comprising component (B) is employed in order to hold or retain the liquid polydiorganosiloxane comprising component (A) at the surface thereof. This silica powder must have a specific surface of at least 50 m$^2$/g and preferably has a specific surface of at least 100 m$^2$/g. When silica powder with a specific surface below 50 m$^2$/g is used to carry/retain the liquid polydiorganosiloxane comprising component (A), a sticky semi-solid containing large granules will be obtained and the microparticulate state cannot be retained. The silica powder under consideration comprises the microparticulate silica powders generally known as dry-method silicas that are obtained by vapor-phase methods and the microparticulate silica powders generally known as wet-method silicas that are obtained by wet methods. The dry-method silicas are preferred.

The silica powder must be admixed at 40 to 200 weight parts per 100 weight parts of liquid polydiorganosiloxane comprising component (A), 50 to 100 weight parts per 100 weight parts liquid polydiorganosiloxane comprising component (A) being preferred. When less than 40 weight parts silica powder is used to carry/retain the liquid polydiorganosiloxane comprising component (A), a sticky semi-solid containing large granules will again be obtained and a powder state cannot be retained. On the other hand, at above 200 weight parts the excessively large quantity of the silica powder component causes a decline in the modifying activity for thermoplastic resins.

The polyorganosiloxane resin comprising the component (C) used by the present invention is the component that characterizes or distinguishes the present invention. This polyorganosiloxane resin is the crucial component for ameliorating the surface tack developed by the powder constituted of components (A) and (B). It is essential that this polyorganosiloxane resin be a solid at ambient temperature, while it is preferred that it be a powder and that it be soluble in the liquid polydiorganosiloxane comprising component (A). This polyorganosiloxane resin adsorptively adheres to component (A), which is the tacky component at the surface of the powder formed from components (A) and (B), and thereby renders said surface nontacky. This polyorganosiloxane resin consists essentially of siloxane units of the formula R$_3$SiO$_{\frac{1}{2}}$ and siloxane units of the formula SiO$_2$ in a molar ratio of 1:4 to 1:1, respectively. That is, the polyorganosiloxane resin is essentially represented by the formula

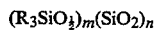

$$(R_3SiO_{\frac{1}{2}})_m(SiO_2)_n$$

where R is an alkyl radical, preferably having less than six carbon atoms, or a phenyl radical and in which m and n are integers having values of at least 1 and the molar ratio of m:n must be 1:4 to 1:1. Preferably, R is methyl. When the m:n molar ratio falls below 1:4, gelation readily occurs during synthesis of the corresponding polyorganosiloxane resin. When this molar ratio exceeds 1:1, the molecular weight of the polyorganosiloxane resin becomes too low and the tendency arises for this component not to be a solid at room temperature. The polyorganosiloxane resin under consideration can be synthesized by well known methods. This synthesis can be carried out in an organic solvent such as toluene, xylene, etc., and a microfine powder can be prepared by removing the organic solvent from the reaction solution while vigorously agitating. The polyorganosiloxane resin under consideration frequently contains residual silanol groups. However, it is preferred that these be thoroughly dehydratively condensed in organic solvent or capped by treatment with a silylating agent such as, for example, hexamethyldisilazane.

Compared with the addition of liquid polydiorganosiloxane by itself, there is no loss of functional effects (moldability, lubrication, etc.) associated with the addition of the polyorganosiloxane resin-treated powder to thermoplastic resin. Otherwise, polyorganosiloxane resin composed principally of the RSiO$_{3/2}$ unit (R defined as above) does not afford a treatment effect as described above because it is generally insoluble in the liquid polydiorganosiloxane comprising component (A) and behaves like an ordinary inorganic powder. Also, organic solid compounds such as, for example, solid waxes, etc., are essentially incompatible with the liquid polydiorganosiloxane comprising component (A), and this makes surface treatment as described above essentially impossible. In addition, both of these separate with the passage of time.

Component (C) is preferably added at 10 to 50 weight parts per 100 weight parts component (A). A satisfactory treatment effect is not obtained at less than 10 weight parts, and the surface tack of the powder prepared from components (A) and (B) therefore cannot be overcome. At more than 50 weight parts, the reciprocal decline in the quantity of liquid polydiorganosiloxane comprising component (A) and the increase in the quantity of component (C) causes a decline in the modifying effect for thermoplastic resins.

It has been found that the inclusion of certain higher carboxylic metal salts, such as magnesium stearate, is deleterious to the intended application of the instant powders. Such materials are therefore specifically excluded from the powder compositions.

The powder of the present invention is prepared by first mixing components (A) and (B) under a sufficient, but not excessive, shear in order to prepare a powder in which the surface of component (B) is coated with component (A) and by then mixing this intermediate powder with component (C). In order to form the intermediate powder in which component (B) is coated with component (A), mixing must be conducted under a necessary, but not excessive, shear. As above, this state is a type of metastable state. At low shear, treatment does not develop adequately and the system will be nonuniform. As the shear increases, the system becomes a uniform micropowder. When a shear is imparted that exceeds that which is necessary, aggregation develops and the system frequently becomes lumpy. As in the first step, the mixing of component (C) into the intermediate powder also requires mixing using a sufficient but not excessive shear. In this case, treatment is unsatisfactory at low shear, and the system will still manifest tack. On the other hand, the use of shear in excess of that which is necessary results in the formation of hard lumps, as before. The condition under consideration depends not only on the type of mixing device, but on the configuration of the stirring blade(s) or screw(s) in the mixer, and so forth. It is therefore not a constant and must be determined for the particular mixing device used by routine experimentation. Mixing devices that can be used to prepare the powder of the present invention are exemplified by the Henschel ™ mixer and Super ™ mixer.

The powder of the present invention, as described hereinbefore, does not suffer from separation of the liquid polydiorganosiloxane, is highly stable, and does not evidence surface tack or stickiness. In addition, this powder will not adhere to the machine surfaces either when the powder is initially mixed with thermo,plastic resin or when the powder is directly introduced into an extruder mixer. With respect to the addition of this powder to thermoplastic resin, there is no loss of the original modifying activity of the liquid polydiorganosiloxane, particularly with regard to moldability, lubrication or slip characteristics. Accordingly, the powder in accordance with the present invention is extremely useful as an additive for modifying thermoplastic resins such as polyethylene, polypropylene, and polystyrene, inter alia. It is contemplated that from about 0.1 part by weight to about 11 parts by weight of the powder is to be used for each 100 parts by weight of the resin. Preferably, 0.1 part to about 6 parts are used for each 100 parts of resin.

EXAMPLES

The present invention is explained in greater detail below through illustrative examples. In the examples, viscosity refers to the value at 25° C., cs is an abbreviation for centistokes, and Me represents the methyl group.

Example 1

Four hundred grams of dry-method silica micropowder with a specific surface of 200 m²/g (Aerosil ™ 200 from Nippon Aerosil Kabushiki Kaisha, Japan) and 600 g of trimethylsiloxy-endblocked polydimethylsiloxane with viscosity=12,500 cs were introduced into a 20 L Super ™ mixer (Kabushiki Kaisha Kawada Seisakusho, Japan). Micropowder (A) was obtained by mixing for 10 minutes at 1,500 rpm. This was followed by the introduction of 300 g of a siloxane resin consisting essentially of the unit, $(Me_3SiO_{\frac{1}{2}})_m(SiO_2)_n$ (m:n=0.8: 1), which resin was solid at ambient temperature. Stirring at 1,500 rpm for 10 minutes gave a micropowder (B). The tack or stickiness of this micropowder (B) was evaluated by touch. In addition, micropowder (B) was introduced into a metal beaker and then poured out, and adhesion of micropowder (B) to the walls of the beaker was evaluated. These measurement results are reported below in Table 1.

Comparison Example 1

Micropowder (A), as prepared in Example 1, was evaluated as in Example 1 for its surface tack and adhesion to the walls of the metal beaker. These measurement results are also reported in Table 1 below.

Comparison Example 2

A micropowder (C) was prepared by the procedure of Example 1, but in this case using a solid polyorganosiloxane resin with the formula $MeSiO_{3/2}$ in place of the solid polydimethylsiloxane resin $(Me_3SiO_{\frac{1}{2}})_m(SiO_2)_n$ used in Example 1. This powder was also evaluated as in Example 1 for its surface tack and beaker wall adhesion, and these measurement results are reported in Table 1 below.

Comparison Example 3

A micropowder (D) was prepared by the procedure of Example 1, but in this case using magnesium stearate in place of the solid polydimethylsiloxane resin $(Me_3SiO_{\frac{1}{2}})_m(SiO_2)_n$ used in Example 1. This powder was also evaluated as in Example 1 for its surface tack and beaker wall adhesion, and these measurement results are reported in Table 1 below.

Example 2

Twenty five grains of polypropylene resin chips (Noblen ™ Y101 from Sumitomo Kagaku Kogyo, Japan) and 1.0 g micropowder (B) as prepared in Example 1 were introduced into a LabPlast ™ Mill (Model C, 250 cc capacity, from Toyo Seiki, Japan). Mixing was carried out with heating to 210° C. for 10 minutes at 100 rpm. Then, while continuing to mix, cooling was carried out to below the melting point of the polypropylene resin (170° C.) to yield polypropylene resin flake. This flake was injection molded to give a JIS #2 dumbbell and a circular disk molding. Tensile strength testing was executed based on JIS K 6758 and JIS K 7113. A cylindrical molding was also molded from only the polypropylene resin (control). Using this and the above-mentioned circular disk molding, the sliding coefficient of friction was measured using a thrust Friction Wear Tester (Toyo Seiki) by rubbing at a pressure of 1 kg/cm²/g and a sliding velocity of 10 cm/s. The error on the sliding coefficient of friction was approximately ±0,025. These measurement results are reported in Table 2.

Comparison Example 4

Polypropylene resin composition flake was prepared by the procedure of Example 2, but in this case micropowder (A) was used in place of the micropowder (B) used in Example 2. The properties of this flake were measured as in Example 2, and these measurement results are reported in Table 2.

Comparison Example 5

Polypropylene resin composition flake was prepared by the procedure of Example 2, but in this case micropowder (C) from Comparison Example 2 was used in place of the micropowder (B) used in Example 2. The properties of this flake were measured as in Example 2, and these measurement results are reported in Table 2.

Comparison Example 6

Polypropylene resin composition flake was prepared by the procedure of Example 2, but in this case micropowder (D) from Comparison Example 3 was used in place of the micropowder (B) used in Example 2. The properties of this flake were measured as in Example 2, and these measurement results are reported in Table 2.

TABLE 1

|  | surface tack | adhesion to beaker walls |
| --- | --- | --- |
| Example 1 | tack not observed | no adhesion |
| Comparison Example 1 | tack observed | adhesion present |
| Comparison Example 2 | tack observed | adhesion present |
| Comparison Example 3 | tack observed | adhesion present |

TABLE 2

|  | tensile strength (kg/cm$^2$) | coefficient of sliding friction |
| --- | --- | --- |
| Example 2 | 320 | 0.15 |
| Comparison Example 4 | 310 | 0.20 |
| Comparison Example 5 | 310 | 0.20 |
| Comparison Example 6 | 310 | 0.20 |

That which is claimed is:

1. A composition consisting essentially of
   (A) 100 parts by weight of a liquid polydiorganosiloxane selected from the group consisting of polydimethylsiloxane polymers, dimethylsiloxane-methyloctylsiloxane copolymers, methylphenylsiloxane-dimethylsiloxane copolymers and diphenylsiloxane-dimethylsiloxane copolymers;
   (B) 40 to 200 parts by weight of a silica powder that has a specific surface area of at least 50 m$^2$/g, said silica (B) being selected from the group consisting of a wet-method silica and a dry-method silica; and
   (C) 10 to 50 parts by weight of a polyorganosiloxane resin which is a solid at room temperature, said resin consisting essentially of (R$_3$SiO$_{\frac{1}{2}}$) siloxane units and (SiO$_2$) siloxane units in the molar ratio of 1:4 to 1:1, respectively, where R is selected from the group consisting of alkyl radicals and phenyl radical, said composition being a powder.

2. The composition according to claim 1, wherein R of said polyorganosiloxane resin (C) is a methyl radical.

3. The composition according to claim 2, wherein said liquid polydiorganosiloxane (A) is polydimethylsiloxane.

4. The composition according to claim 3, wherein from 50 to 100 parts by weight of said silica powder (B) is employed for each 100 parts by weight of said liquid polydiorganosiloxane (A).

5. A siloxane powder composition prepared by mixing
   (A) 100 parts by weight of a liquid polydiorganosiloxane; selected from the group consisting of polydimethylsiloxane polymers, dimethylsiloxane-methyloctylsiloxane copolymers, methylphenylsiloxane-dimethylsiloxane copolymers and diphenylsiloxane-dimethylsiloxane copolymers
   (B) 40 to 200 parts by weight of a silica powder that has a specific surface area of at least 50 m$^2$/g and is selected from the group consisting of a wet-method silica and a dry-method silica using sufficient shear to prepare a powder in which the surface of component (B) is coated with component (A), and then mixing this powder with
   (C) 10 to 50 parts by weight of a polyorganosiloxane resin which is a solid at room temperature, said resin consisting essentially of (R$_3$SiO$_{\frac{1}{2}}$) siloxane units and (SiO$_2$) siloxane units in the molar ratio of 1:4 to 1:1, respectively, where R is selected from the group consisting of alkyl radicals and phenyl radical.

6. The composition according to claim 5, wherein R of said polyorganosiloxane resin (C) is a methyl radical.

7. The composition according to claim 6, wherein said liquid polydiorganosiloxane (A) is polydimethylsiloxane.

8. The composition according to claim 7, wherein from 50 to 100 parts by weight of said silica powder (B) is employed for each 100 parts by weight of said liquid polydiorganosiloxane (A).

9. The composition according to claim 1, wherein said polydiorganosiloxane (A) is a trimethylsiloxy-endblocked polymer selected from the group consisting of polydimethylsiloxane polymers, dimethylsiloxane-methyloctylsiloxane copolymers, methylphenylsiloxane-dimethylsiloxane copolymers and diphenylsiloxane-dimethylsiloxane copolymers.

10. The composition according to claim 9, wherein R of said resin (C) is methyl.

11. The composition according to claim 10, wherein said polydiorganosiloxane (A) is polydimethylsiloxane.

12. The composition according to claim 11, wherein from 50 to 100 parts by weight of said silica powder (B) is employed for each 100 parts by weight of said component (A).

* * * * *